United States Patent [19]

Dick

[11] Patent Number: 4,688,447
[45] Date of Patent: Aug. 25, 1987

[54] VEHICLE TORQUE TRANSFER GEAR ASSEMBLY HAVING DIFFERENT ANGLED OUTPUT SHAFTS

[75] Inventor: Wesley M. Dick, Sylvania, Ohio

[73] Assignee: Dana Corporation, Toledo, Ohio

[21] Appl. No.: 718,748

[22] Filed: Apr. 1, 1985

[51] Int. Cl.⁴ .............................................. F16H 37/06
[52] U.S. Cl. ................................ 74/665 T; 74/665 F
[58] Field of Search ...... 74/665 F, 665 GA, 665 GD, 74/665 H, 665 S, 665 T, 700, 694, 417, 412 R, 424; 180/233, 238, 245, 247

[56] References Cited

U.S. PATENT DOCUMENTS

| | | | |
|---|---|---|---|
| 2,195,479 | 4/1940 | Buchner | 74/700 |
| 2,223,522 | 12/1940 | Kysor | 74/665 H |
| 4,147,225 | 4/1979 | Mazziotti et al. | 74/665 F |
| 4,270,409 | 6/1981 | Glaze et al. | 74/665 GA |
| 4,289,213 | 9/1981 | Seaman | 74/665 H |

FOREIGN PATENT DOCUMENTS

| | | | |
|---|---|---|---|
| 967160 | 8/1964 | United Kingdom | 180/245 |
| 1355953 | 6/1974 | United Kingdom | 180/245 |

*Primary Examiner*—Allan D. Herrmann
*Assistant Examiner*—David Novais
*Attorney, Agent, or Firm*—Charles F. Schroeder

[57] ABSTRACT

A vehicle torque transfer gear assembly unit for driving four wheels of a vehicle in which both the rear and front output shafts of the unit are capable of straight line connected relation with the rear and front drive shafts of the vehicle thereby eliminating the need for complex compound angled connecting means. The preferred embodiment exemplifying the invention is a five gear assembly of two input gears and three output gears selectively connectable for two wheel or four wheel high speed operation, or four wheel low speed operation beside a neutral mode. The rear output shaft is aligned in a straight line with the rear drive shaft extending downwardly toward the rear wheel differential while the front output shaft extends downwardly in the opposite direction to the front drive shaft toward the front wheel differential. The cross axised relation of the output shafts is effected by utilization of a frustum shaped front output gear having helical cut teeth matched to an intermediate gear on an axis parallel to the rear output shaft. As another embodiment, the front output shaft angle is produced by addition of an angular association of the intermediate shaft and gears thereon relative to the rear output gear and an angular association of the front output shaft and gear relative thereto by use of frustum shaped front output gear with helical cut gear teeth matched to the desired angle.

11 Claims, 6 Drawing Figures

VEHICLE TORQUE TRANSFER GEAR ASSEMBLY HAVING DIFFERENT ANGLED OUTPUT SHAFTS

BACKGROUND OF THE INVENTION

This invention relates to a torque transfer gear assembly for supply of drive power to either 2 or 4 wheels of a vehicle and more particularly to a gear transfer unit having an input shaft and two output shafts with different angular output orientations to permit optimization of orientation of the unit and at the same time facilitating ready aligned connection to the front and rear drive shafts of the vehicle.

Torque transfer mechanisms for supply of drive power to four wheels of a vehicle are usually connected to the vehicle transmission which in turn is connected to be driven by the vehicle engine. The torque transfer unit is thus an extension of the engine and transmission drive train and its location, usually under the driver's compartment, is limited in range by the important considerations of effectiveness and efficiency of operation of the power supply train and need for accommadation to the presence of other adjacent automotive components such as exhaust system components. When the engine is located over the front wheels of the vehicle, as is generally the case, the engine and its connected transmission and torque transfer units are angled downwardly in alignment with the rear drive shaft leading to the rear wheel differential. Customarily the front and rear output shafts of the transfer unit such as a conventional five gear transfer unit, however, are parallel with the input shaft, and the front wheel output shaft is therefore usually not oriented optimally for ready connection with the front wheel drive shaft. In other words, the transfer unit in connection with the engine and transmission can be aligned in straight line relation with the rear wheel shaft, but this does not place the front output shaft of the transfer unit in proper orientation for straight line connection with the front drive shaft to the front differential. This inability to establish straight alignment with the front drive shaft can be compensated for to a degree by special joints and, in some cases to a degree by compound double angular joints, but such joints are usually less than desirable because of their complexity in mechanics and dynamics of operation, need for care and costliness.

SUMMARY OF THE INVENTION

It is therefore an object of the present invention to provide a torque transfer gear assembly unit for four wheel drive operation of an automotive vehicle which can be designed with output shafts having orientations which allow angular lateral orientation of the unit itself as well as ready aligned connection to the front and rear wheel drive shafts without need for other than simple ordinary connecting joints.

This and other objects of the invention are accomplished by the present invention by providing in a torque transfer unit having constant mesh gearing, cross axised helical gearing to allow at least one of the output shafts to be set at a proper angle for optimization of drive shaft joint connections. The constant mesh gearing in which the invention is herein exemplified comprises an input gear set associated supplied with power by an input shaft and an output gear set associated supplying power to both a rear wheel output shaft and a front wheel output shaft. In the preferred embodiment of the invention an intermediate shaft acts in a sense as a power path shifting shaft permitting selective connection to both the rear and front wheel output shafts. The front output shaft is driven by a front output cross axised helical gear mated with a gear on the intermediate shaft and driven as one of the output set of gears. The angular cut of teeth of the helical gear permits a corresponding angular orientation of the front output shaft relative to the input shaft to allow establishment of a lower angle connection with the front drive shaft than is possible with an output shaft parallel to the input shaft. Ordinary connecting joint members such as a conventional cardan joint at each end of the drive shaft can be utilized to complete the power connection between the transfer unit and front wheel differential. As another embodiment of the invention, both the front output and the intermediate shafts can be provided a cross axised orientation to each other as well as having a cross axised relation between the intermediate shaft and the input shaft, thereby, distributing and increasing the possible front output shaft angle relative to the input shaft. A greater design flexibility is thus provided in placement and connection of the unit to the rear and front drive shafts of the torque transfer unit.

BEST MODE OF CARRYING OUT THE INVENTION

Figure 1:
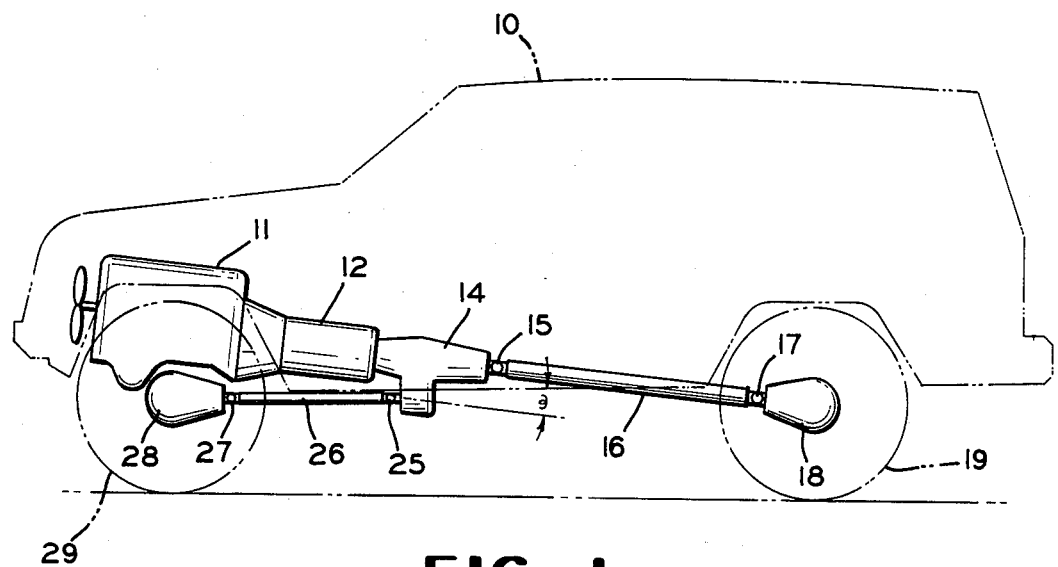
FIG. 1 is a schematic side elevational view of a vehicle illustrating the conventional alignment and connection of a transfer unit in the power train for supply of power to both the rear and front wheels.

Referring to the drawings in greater detail, FIG. 1 illustrates a four wheeled vehicle 10 having a conventional straight alignment of drive components from the engine 11 to the rear wheel differential through the transmission 12 and the transfer unit 14 which are connected by way of a connecting joint 15 to a rear drive shaft 16 joined to the differential 18 by a connection joint 17 to drive the rear wheels 19. Since the rear wheels are at a lower level than the engine level, this alignment is generally downward toward the rear of the vehicle. The rear output shaft of the transfer unit 14 is thus also inclined generally downwardly. This causes the front output shaft extending forward from the conventional geared transfer unit and which is usually parallel to the rear output shaft to have a generally upward inclination. In view of this upward inclination of the front output shaft, an angular joint 25 must be provided for connection with the drive shaft 26 extending downwardly therefrom to the front differential 28 which has a joint connection 27 at its other end to drive the front wheels 29.

Figure 4:
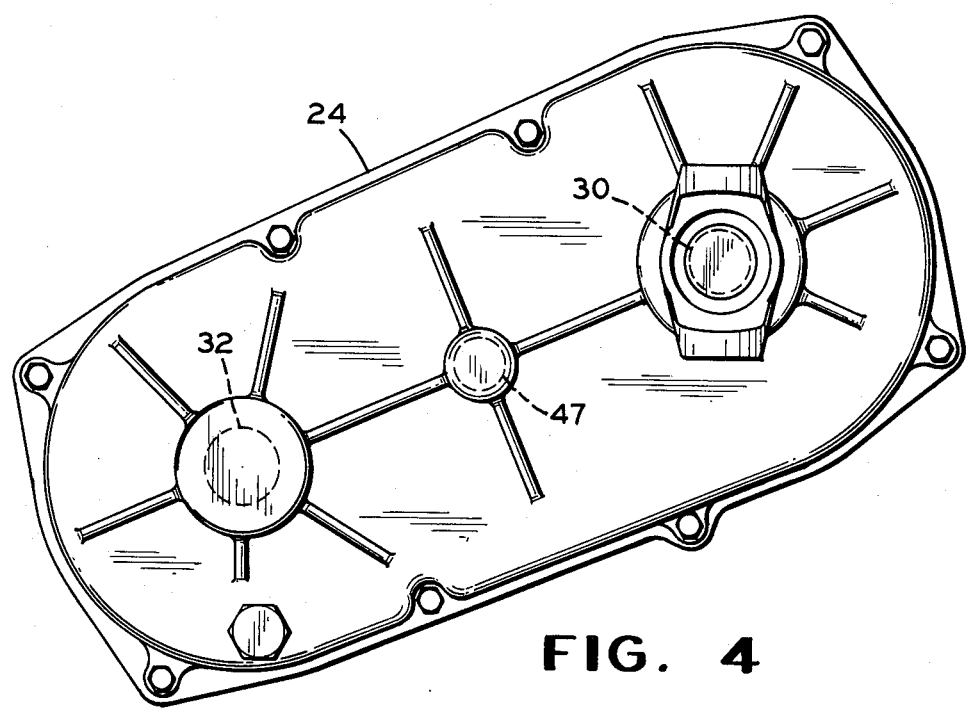
FIG. 4 is an end elevational view of an end of the gear case for the transfer unit of FIG. 3 illustrating the general angular orientation of the unit relative to ground level of the vehicle.

Beside the front output shaft of the transfer unit 14 being misaligned and requiring an angular connection 25 to the front drive shaft 26, another aspect of this alignment arrangement is that the transfer unit 14 is required to be oriented with a laterally downward angle from the level of the input and rear output shaft to the lower level of the front output shaft as illustrated in FIG. 4 to permit adjacent accomodation of other components on the underside of the vehicle such as exhaust system components.

Figure 2:
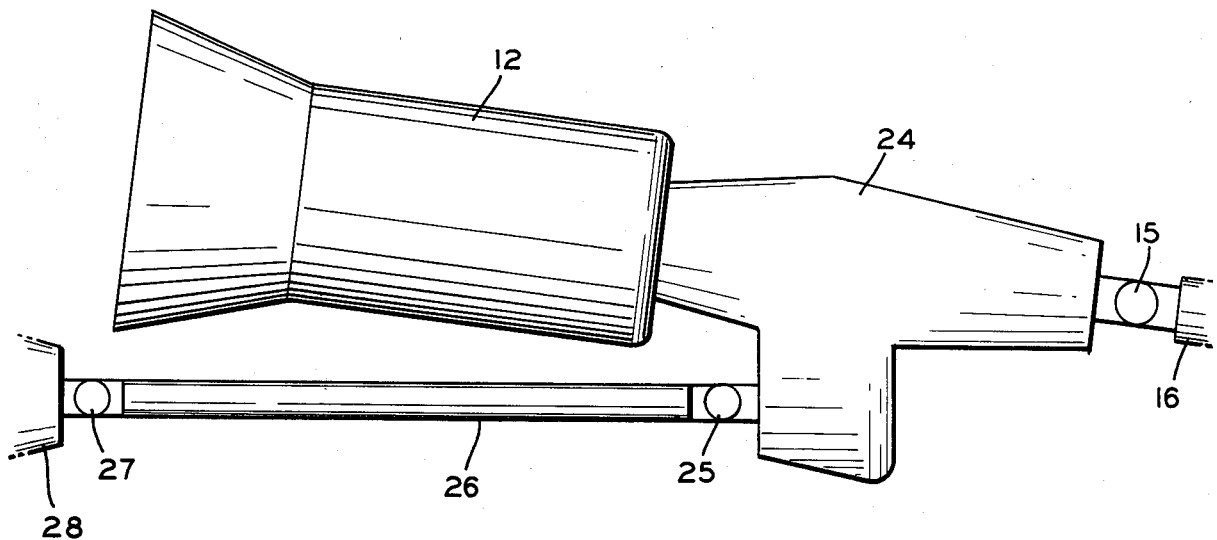
FIG. 2 is an enlarged schematic view of a portion of a vehicle drive train illustrating the transfer unit of the present invention with straight line joint connections between the rear and front output shafts with the rear and front drive shafts, respectively.

FIG. 2 is a schematic illustration of the transmission unit 12 having a straight line relation with a torque transfer unit 24 of the present invention wherein the power output of the unit 24 to the front wheel differential 28 can be supplied in straight alignment with an angularly oriented front output shaft 32, thus eliminating need for the otherwise more complex angular connection required in the angular connecting arrangement illustrated in FIG. 1.

Figure 3:
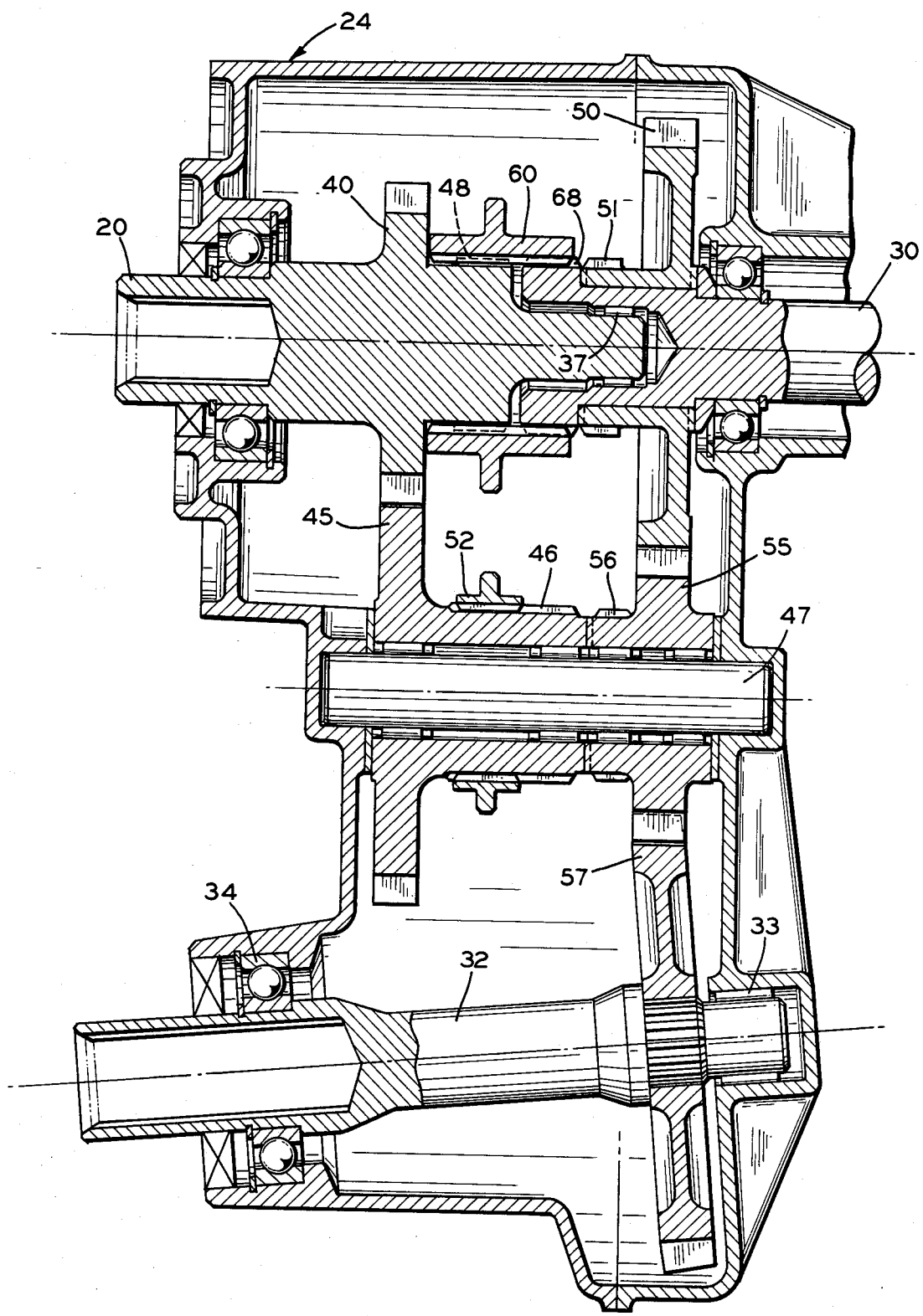
FIG. 3 is a horizontal cross sectional view of the gear assembly of the torque transfer unit of FIG. 2 illustrating how the invention can be incorporated in a constant mesh five gear torque transfer arrangement to effect a straight line alignment of the unit with drive shafts for 2 and 4 wheel drive modes of the vehicle.

FIG. 3 is a cross sectional view of the torque transfer unit 24 showing interior details of the gear assembly of this preferred form of the invention illustrated schematically in FIG. 2. An input drive shaft 20 supplied torque power to the associated gear assembly for driving the rear and front wheel output shafts, 30 and 32, respectively. The input drive shaft 20 is axially aligned with the rear output shaft 30, each shaft being rotatable independent of the other, but inter-associated by providing the input shaft 20 with a reduced diameter end portion extending coaxially into a hollowed end portion of the rear output shaft 30. A small gap between the mated coaxial ends of the shafts provide a space for a needle bearing 37 to provide mutual support for the two shafts 20 and 30.

Two sets of constant mesh gears make up the torque transfer gear assembly, namely an input gear set and an output gear set. The input gear set includes an input gear 40 in constant mesh with a larger diameter low speed gear 45. The input gear 40 is fixed on input shaft 20 and can be formed integrally with the input shaft as shown, to provide a solid constantly aligned combination. The low speed gear 45 is mounted for rotation on roller bearings on an intermediate shaft 47.

The output gear set includes a rear drive gear 50 in constant mesh relation with a smaller intermediate gear 55 which in turn is in constant mesh with the front output gear 57 generally of the same size as the rear drive gear 50 and angularly oriented with its output shaft extending in a generally downward direction, as further explained hereinafter. The rear drive gear 50 is supported in rotational relation on the rear output shaft 30 while the intermediate gear 55 is rotatably mounted on roller bearings on the intermediate shaft 47 and the front drive gear 57 is fixed in splined relation on the ball bearing supported front output shaft 32.

The drive power paths through the gear assembly are selectively changed by lateral shifting of internally splined collars 60 and 52 on and between splines 48 and 68 at the confronting exterior ends of the input and rear output shafts 20 and 30, respectively, splines 51 on the exterior of a hub of the rear drive gear 50 and splines 46 and 56 on confronting hubs of the low speed gear 45 and the intermediate gear 55 respectively, both on the intermediate shaft 47.

A single manually controlled laterally movable fork (not shown) engages and moves both the high and low speed collars 60 and 52, respectively, into selected positions for desired operating modes of the transfer unit 24. Two wheel high, four wheel high, neutral and four wheel low speed modes can thus be selected by progressive step by step repositioning of the collars 60 and 52 to the right from their position in FIG. 3. The collars as shown in FIG. 3 are in the two wheel high speed mode in that the internal splines of collar 60 engage splines 48 of the input gear in bridging relation with splines 68 of the rear output shaft 30 while the low speed collar 52 is in active position on the splines 42 of the hub of the low speed gear 45. The input shaft 20 and rear output shaft 30 are thus connected together in straight line relation for direct drive of the rear wheels.

Upon shift of the collars 60 and 52 step to the right in unison, the splines 51 on the hub of the rear drive gear 50 are additionally engaged, thus causing the three output gears 50, 55 and 57 to be driven by the input shaft 20 through the rear output shaft 30 and causing the angularly oriented front output shaft 32 to be driven in addition to the rear output shaft 30. Since the rear output gear 50 and the front output gear 57 have the same effective size, both the rear and front output shafts are driven at the same rotational speeds in the four wheel high speed driving mode.

Upon movement of the collars 60 and 52 another step to the right in FIG. 3, the collar 60 is disengaged from the splines 48 of input gear 40 and collar 52 still remains in an inactive position on splines 46 of the low speed gear 45. The assembly thus is placed in a neutral mode in which neither the rear or front drive shafts, 30 and 32 respectively, are driven.

Upon moving the collars 60 and 52 still another step to the right in FIG. 3, the splines 56 of the intermediate gear 55 are brought into bridging relation with the splines 46 of the low speed input gear 45. Since the slow speed gear 45 has a larger diameter than the input gear 40 with which it is in constant mesh, its rotational speed is less than that of the input gear and correspondingly, the rotational speed of the intermediate gear 55 of the output set of gears is driven at a slower rotational speed than that of the input shaft 20. In this mode the intermediate gear 55 drives both the rear output gear 50 and the output shaft 30 as well as the angularly mated front output gear 57 and the corresponding angularly oriented front output shaft 32. The output shafts 30 and 32 are driven at rotational speeds less than the speed of the input shaft 20, both because of the lower speed of the gear 55 and the fact that the output gears 50 and 57 are larger in diameter than the intermediate gear 55.

Referring now more specifically to the invention as embodied in the relation of the front output shaft 32, supported in the front and rear bearings 33 and 34, respectively, the front output gear 57 is a frustum shaped conical gear to permit the downward angular orientation of the front output shaft 32. In addition, the teeth of the gear 57 are provided a cross cut or helical orientation which permits the non-intersecting cross axised orientation of the shaft 32 extending outside the plane of the shafts 20, 30 and 47 to produce the desired straight line connection of the output shaft 32 with the front drive shaft 26 extending to the front differential 28 of the vehicle 10. In other words, because of the required angular disposition of the torque unit 24 in the vehicle relative to the ground level, the rear output shaft 30 and front output shaft 32 are laterally separated and at different levels from ground level. Ordinary bevel gears thus are not adequate to provide for alignment. It has been found that the combination of both a frustum shape for the gear and helical teeth will provide the required cross axised orientation of shaft 32 for the desired straight line connection with the drive shaft 26.

The helical cut teeth of the gear 57 may be provided an angle to permit its mating with axis-parallel teeth of spur gear forms of the rear output and intermediate gears 50 and 55, respectively. To provide a smoother and quieter operation of the gears, however, the rear output and intermediate gears can also be provided with matching helical or cross cut teeth having slightly different angled helical teeth from the front output gear 57 to accomplish the angular orientation of the gears and front output shaft 32 on which it is mounted. Such cross cut or helical gear teeth provide additional beneficial results in the form of less vibrational and quieter operation in comparison to spur gears for the rear output and intermediate gears 50 and 55, respectively.

Figure 5:
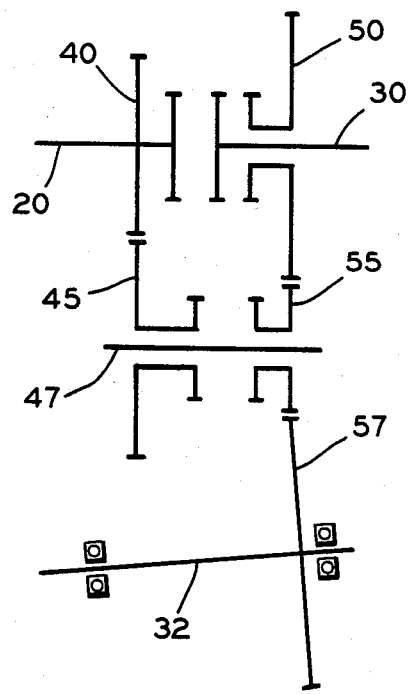
FIG. 5 is a schematic illustration of the five gear assembly of FIG. 3.

FIG. 5 illustrates schematically the gear assembly of FIG. 3 and represents in plan view both the lateral and vertical displacement of the output end of the front output shaft 32 compared to the parallel relation of the parallel input, rear output and intermediate shafts 20, 30 and 47, respectively.

Figure 6:
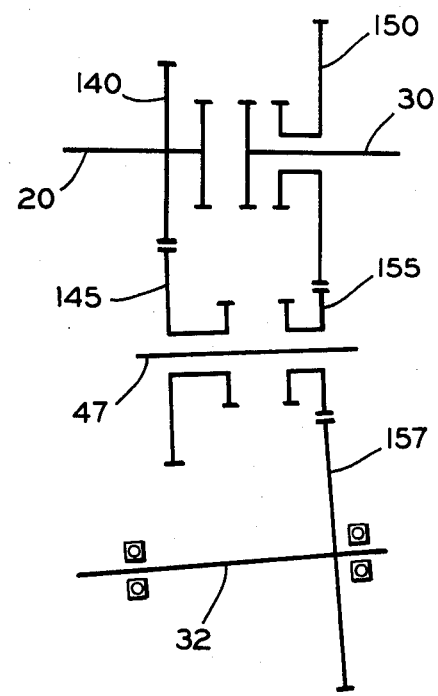
FIG. 6 is a schematic illustration of the five gear assembly of another embodiment of the invention in which the total angle of the front output shaft relative to the input shaft is provided by angular orientation of both the intermediate and front output shafts relative to the input shaft.

FIG. 6 illustrates schematically another embodiment of the gear assembly of this invention wherein both the intermediate and front output shafts 47 and 32, respectively, have cross axised orientations in lines non-intersecting relative to each other as well as to the associated input and rear output shafts 20 and 30, respectively. A constant mesh input set of gears in this assembly include an input gear 140 and a low speed gear 145. A constant mesh output set of gears include a rear output gear 150, an intermediate gear 155 on the intermediate shaft 47 and a front output gear 157 on the front output shaft 32. The total angular difference in orientation or displacement of the output end of the front output shaft 32 both downward and laterally from parallelism with the input shaft 20 in this embodiment is distributed or shared by the cumulative angular displacement of the intermediate shaft 47 relative to the input shaft 20. This sharing of the total angle of the output shaft 32 by an angular intermediate shaft 47 reduces the angle from shaft to shaft to provide the desired front output shaft angle and simplified tooling for manufacture of the angular toothed gears. The low speed gear 145 and output gears 155 and 157 are conical gears of frustum shape and in view of the compound non-intersecting cross axixed angular orientation of the intermediate shaft 47 and front output shaft 32 relative to each other and relative to the input shaft 20, they are produced with angular helical cut gear teeth matching the needs for the shaft orientations desired.

The range of selection of angular displacement of the front output shaft relative to the axis of the rear output shaft in the preferred embodiment represented in FIGS. 2 to 5 is from 3 degrees to 25 degrees. When the angular displacement from the rear output shaft is to be about 15 degrees and over, however, the embodiment of FIG. 6 is preferred in which case a maximum of 30 degree displacement of the front output shaft relative to the rear output shaft is possible with a 15 degree angle of the intermediate shaft axis relative to the rear output shaft.

In view of the foregoing it will be understood that variations of the invention can be provided within the broad scope of principles embodied therein. Thus while particular preferred embodiments have been shown and described, it is intended by the appended claims to cover all such modifications which fall within the true spirit and scope of the invention.

I claim:

1. In a front and rear wheel driven vehicle a combination comprising an engine, a transmission unit, a front and rear wheel torque transfer gear unit, a rear wheel differential lower in level than said engine and a connecting rear drive shaft between said torque transfer unit and said rear differential, said transfer unit including an input shaft supplied with torque power from said transmission and engine and a rear output shaft connected to said rear drive shaft, said engine, transmission, input shaft, rear output shaft and rear drive shaft all being aligned in straight line relation from said engine downwardly to said rear wheel differential, a front wheel differential also at a level lower than said engine, a front dirve shaft connected to said transfer unit extending in a direction opposite from said rear output shaft and being connected between said transfer unit and said front differential, said transfer unit having a front output shaft extending in a direction opposite from said rear output shaft and means for drivingly connecting said input shaft to said front and rear output shafts, said front output shaft and front drive shaft being laterally disposed at a level lower in said vehicle than said rear output shaft and being connected in straight line relation from said output shaft to said front wheel differential, said torque transfer gear unit comprising a set of three constant mesh output gears including a rear output gear on said rear output shaft, a rotatable intermediate gear mounted on an intermediate shaft and a front output gear on said front output shaft, said front output shaft being angularly aligned with its axis on a line in cross axised non-intersecting relation with said rear output shaft to establish the straight line relation with said front drive shaft.

2. The combination set forth in claim 1 in which said front output gear is a frustum shaped gear with helical gear teeth mated with teeth of said intermediate gear and said front output gear is angularly oriented with said intermediate gear for an angular orientation of said front output shaft in straight line relation with said front drive shaft.

3. The combination set forth in claim 2 in which said intermediate shaft and gear are provided an angular orientation relative to said rear output shaft and gear in addition to said front output shaft and gear whereby the total angular orientation of said front output shaft relative to said rear output shaft is provided in part by said intermediate shaft and the intermediate gear mounted thereon.

4. The combination set forth in claim 3 in which said angularly oriented intermediate shaft has its axis on a line in non-intersecting cross axised relation with the axis lines of both said rear output shaft and said output shaft.

5. The combination set forth in claim 3 in which the gear transfer unit includes a second gear set comprising two constant mesh gears including an input gear fixed on said input shaft and a low speed gear in constant mesh with and larger in diameter than said input gear,
   said low speed gear being mounted in freely rotatable relation on said intermediate shaft,
   said low speed gear being mated angularly with said input gear at an angle corresponding to the angular orientation between said intermediate and rear output gears
   means for selectively connecting said low speed gear for rotation in unison with said intermediate gear of said first gear set whereby drive power supplied from said first gear set to said second gear set for said two output shafts is supplied at a lower rotational speed than the rotational speed of said input gear.

6. A torque transfer gear assembly unit for driving front and rear wheels of a vehicle comprising
   a torque input shaft,
   a gear set of three constant mesh output gears including a rear output gear,
   a rear output shaft on which said rear output gear is mounted,
   a rotatable intermediate gear mounted on an intermediate shaft,
   a front output gear and a front output shaft on which said front output gear is mounted in fixed relation,
   means for drivingly connecting said input shaft to said front and rear output shafts,
   said input shaft and rear output shaft being aligned in straight line relation for a straight line connection with a drive shaft for the rear wheels of the vehicle,
   said front and rear output shafts having their axes in separate non-intersecting vertical planes and oriented in cross axised relation to establish a straight line connection of said front output shaft with a drive shaft for the front wheels of the vehicle.

7. A torque transfer unit as set forth in claim 6 in which said front output gear is a frustum shaped gear with helical teeth mated with teeth of said intermediate gear when said front output gear is angularly oriented with said intermediate gear for a corresponding angular orientation of said front output shaft in straight line relation with a front wheel drive shaft.

8. A torque transfer unit as set forth in claim 6 in which said intermediate gear and shaft are provided an angular orientation relative to said rear output gear and shaft in addition to said front output gear and shaft whereby the total angular orientation of said front output shaft relative to said rear output shaft is provided in part by said intermediate gear and the intermediate shaft on which it is mounted.

9. A torque transfer unit as set forth by claim 8 in which said angularly oriented intermediate shaft has its axis on a line in non-intersecting cross axised relation with the axis lines of both said rear output shaft and said front output shaft.

10. A torque transfer unit as set forth in claim 8 including a second gear set comprising two constant mesh gears including an input gear fixed on said input shaft and a low speed gear in constant mesh with and larger in diameter than said input gear,
    said low speed gear being mounted in freely rotatable relation on said intermediate shaft,
    said low speed gear being mated angularly with said input gear at an angle corresponding to the angular orientation between said intermediate and rear output gears.
    means for selectively connecting said low speed gear for rotation in unison with said intermediate gear of said first gear set whereby drive power supplied from said first gear set to said second gear set for said two output shafts is supplied at a lower rotational speed than the rotational speed of said input gear.

11. A torque transfer gear assembly unit for driving front and rear wheels of a vehicle comprising
    a torque input shaft,
    a gear set of three meshed output gears including a rear output gear,
    a rear output shaft on which said rear output gear is mounted,
    a rotatable intermediate gear mounted on an intermediate shaft,
    a front output gear and a front output shaft on which said front output gear is mounted in fixed relation,
    means for drivingly connecting said input shaft to said front and rear output shafts,
    said input shaft and rear output shaft being aligned in straight line relation for a straight line connect with a drive shaft for the rear wheels of the vehicle,
    said intermediate gear and shaft and said front output gear and shaft having an angular relation with each other and with said rear output gear and shaft to provide a cumulative nonintersecting cross-axised angular relation between said front and rear output shafts in which the axis lines of said output shafts lie in non-intersecting vertical planes for establishment of a straight line connection of said front output shaft with a drive shaft for the front wheels of the vehicle.

* * * * *